United States Patent
Li et al.

(10) Patent No.: US 8,175,256 B2
(45) Date of Patent: May 8, 2012

(54) CALL CENTER SYSTEM AND METHOD FOR OBTAINING INTERFACE INVOKE INFORMATION

(75) Inventors: Wentao Li, Shenzhen (CN); Zhongfeng Cui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1700 days.

(21) Appl. No.: 11/484,905

(22) Filed: Jul. 12, 2006

(65) Prior Publication Data

US 2007/0058793 A1 Mar. 15, 2007

(30) Foreign Application Priority Data

Jul. 12, 2005 (CN) .......................... 2005 1 0084008

(51) Int. Cl.
*H04M 3/00* (2006.01)
(52) U.S. Cl. ........... 379/265.1; 379/265.01; 379/265.02; 379/265.09; 379/265.13
(58) Field of Classification Search ............... 379/266.1, 379/265.09, 265.02, 265.13, 265.01
See application file for complete search history.

(56) References Cited

U.S. PATENT DOCUMENTS

| | | | |
|---|---|---|---|
| 6,567,848 B1 * | 5/2003 | Kusuda et al. ................ 709/219 |
| 2002/0067821 A1 * | 6/2002 | Benson et al. ........... 379/265.02 |
| 2005/0002514 A1 | 1/2005 | Shafiee et al. |

FOREIGN PATENT DOCUMENTS

| | | |
|---|---|---|
| CN | 1321053 A | 11/2001 |
| CN | 1391392 | 1/2003 |
| CN | 1578277 A | 1/2005 |
| KR | 2004032662 | 4/2004 |

OTHER PUBLICATIONS

Written Opinion of the International Searching Authority dated Sep. 21, 2006 issued in connection with PCT Application No. PCT/CN2006/001271.

* cited by examiner

*Primary Examiner* — Antim Shah

(57) ABSTRACT

The present invention discloses a call center system and a method for obtaining interface invoke information to realize automatic analysis of the user behaviors. The method includes steps of sending a connection establishment request message to a user interface server by a call center client after a service is activated; allocating a connection identification for the activated service and sending a response message after the user interface server receives the connection request message; performing interactions between the call center client and the user interface server and recording the interaction message according to the connection identification attached in the interaction message; and decomposing the recorded interaction message and obtaining the information on the application programming interface invoked by each service according to the name of the application programming interface corresponding to the interface identification obtained from each message.

10 Claims, 3 Drawing Sheets

… (US 8,175,256 B2)

CALL CENTER SYSTEM AND METHOD FOR OBTAINING INTERFACE INVOKE INFORMATION

FIELD OF THE INVENTION

The present invention relates to intelligent network, and more particularly to a call center system and a method for obtaining interface invoke information.

BACKGROUND OF THE INVENTION

FIG. 1 is a network configuration diagram of a conventional call center system. Clients with various functions may be developed by using the API (application programming interface) provided by the system. In order to grasp the effect of different clients over the system, the detailed operations of the clients need to be converted into invoke sequences for the API of the system. The invoke frequency of the important API needs to be obtained, and the using characteristic of different users over the measured system is analyzed accordingly, so that the more specified function tests and reliable payload tests may be proposed.

The communication between the call center system and the client is based on private communication protocols. The present commercial test tools may not realize the user behavior analysis directly. At present, the protocol interaction procedure may only be recorded by the protocol interaction record tool in the call center system itself or by the record log when invoking the API through each client, according to which the professionals analyze the user behavior. However, the professionals need to have deep understanding of the protocols, and the manual analysis has the problem of lacking objectivity and accuracy.

SUMMARY OF THE INVENTION

The present invention provides a call center system, which may automatically obtain the information on the API invoked by the user.

The present invention also provides a method for obtaining interface invoke information by using the call center system.

The call center system includes a call center client, a core server, a user interface server and a protocol interaction recording module. The call center client is configured to provide various services matching with the call center system, to generate a message corresponding to the service and to transfer the message to the core server through the user interface server. The core server is configured to process the message transferred by the user interface server and transfer the process result to the call center client through the user interface server. The protocol interaction recording module is connected to the interface between the call center client and the UIS and records the interaction message as well as the relative information in the protocol interaction procedure between the call center client and the UIS, and the interaction message includes an interface identification of the invoked application programming interface and a connection identification corresponding to the service.

The call center system further includes a protocol interaction decomposing module for decomposing each interaction message recorded by the protocol interaction module according to the preset message structure; and a protocol interaction analysis module for generating the invoke information of the application programming interface according to the decomposed information by the protocol interaction decomposing module.

The protocol interaction decomposing module and the protocol interaction analysis module are two individual modules or integrated as one module.

The relative information of the interaction message includes the transmitter and the receiver of each interaction message and/or the interaction time of each interaction message.

The method according to the present invention includes steps of: sending a connection establishment request message to a user interface server by a call center client after a service is activated; upon receiving the connection request message, the UIS allocating a connection identification for the activated service and sending a response message; performing interactions between the call center client and the user interface server, wherein the interaction messages are attached with the connection identification of the activated service and the interface identification corresponding to the application programming interface invoked during the interaction processing, and recording the interaction message according to the connection identification attached in the interaction message; and decomposing the recorded interaction messages and obtaining the information of the application programming interface invoked by each service according to the name of the application programming interface corresponding to the interface identification obtained from each message.

The recorded interaction messages are decomposed one by one according to the interaction sequence of the interaction message to obtain the sequence of the application programming interface invoked by each service.

Alternatively, the frequency of the application program interface invoked by each service is obtained according to the name of the application programming interface.

The interaction messages between the call center client and the user interface server adopt the same message structure.

The recorded interaction message is decomposed according to the message structure.

Furthermore, when the interaction message is recorded, relative information of the interaction message may also be recorded.

The relative information of the interaction message includes the transmitter and the receiver of each interaction message and/or the interaction time of each interaction message.

The present invention also provides an apparatus for processing messages, including: a collection module configured to receive and store the messages from call center clients, every said message including an interface identification and a connection identification; and a processing module configured to process said messages stored in said collection module, wherein upon obtaining said messages, the processing module obtaining and analyzing the interface identification and connection identification of every said message.

The processing module includes: a protocol interaction decomposing module configured to decompose said messages stored in said collection module and output the interface identification and connection identification of every said message; and a protocol interaction analysis module configured to analyzing the interface identification and connection identification.

The interface identification is corresponding to the type of an application programming interface; and said connection identification is corresponding to the type of a service.

The present invention also provides an apparatus for processing messages, including: a unit configured to receive and store the messages from call center clients, every said message including an interface identification and a connection identification; obtain the interface identification and connection identification of every said message; and analyze the interface identification and connection identification.

The interface identification is responding to the type of an application programming interface; said connection identification is responding to the type of a service.

The present invention further provides a system for processing messages, including: a client terminal configured to generate messages corresponding to services respectively; a user interface module connected to said client terminal, for receiving said messages; a server connected to said user interface module, for receiving said messages and sending responses corresponding to said messages to said client terminal; and a unit connected to said client terminal and user interface module, for receiving and storing the messages from said client terminal, every said message including an interface identification and a connection identification; obtaining the interface identification and connection identification of every said message; and analyzing the interface identification and connection identification.

By adding the protocol interaction decomposing module and the protocol interaction analysis module to the conventional call center system, the call center system may automatically analyze the recorded interaction procedure and realize the analysis of the invoked application programming interface.

The method of the present invention decomposes each message recorded in the protocol interaction procedure one by one and obtains the invoke information of the application programming interfaces to generate the invoke sequence and invoke frequency of application programming interfaces. And the present method does not need manual analysis of the protocol interaction procedure.

DETAILED DESCRIPTION OF THE INVENTION

Figure 1:
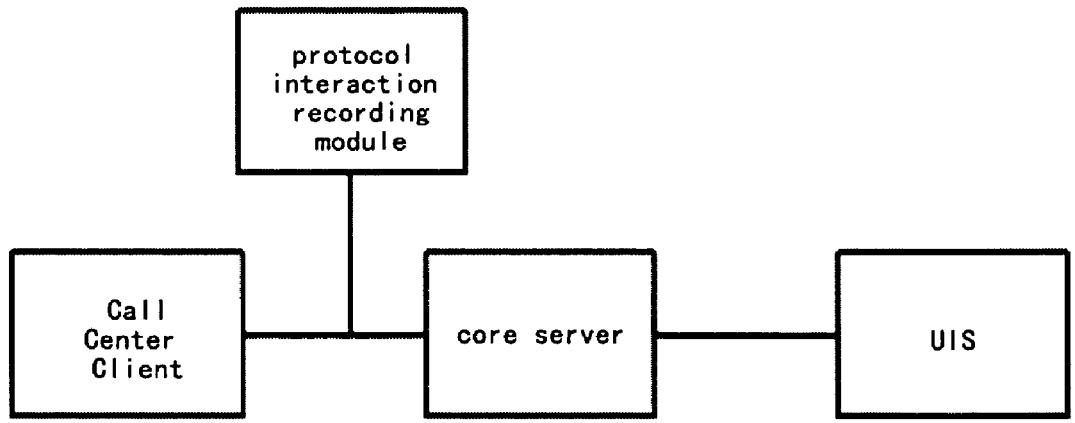
FIG. 1 is a diagram showing the networking configuration of a conventional call center system.
Figure 2:
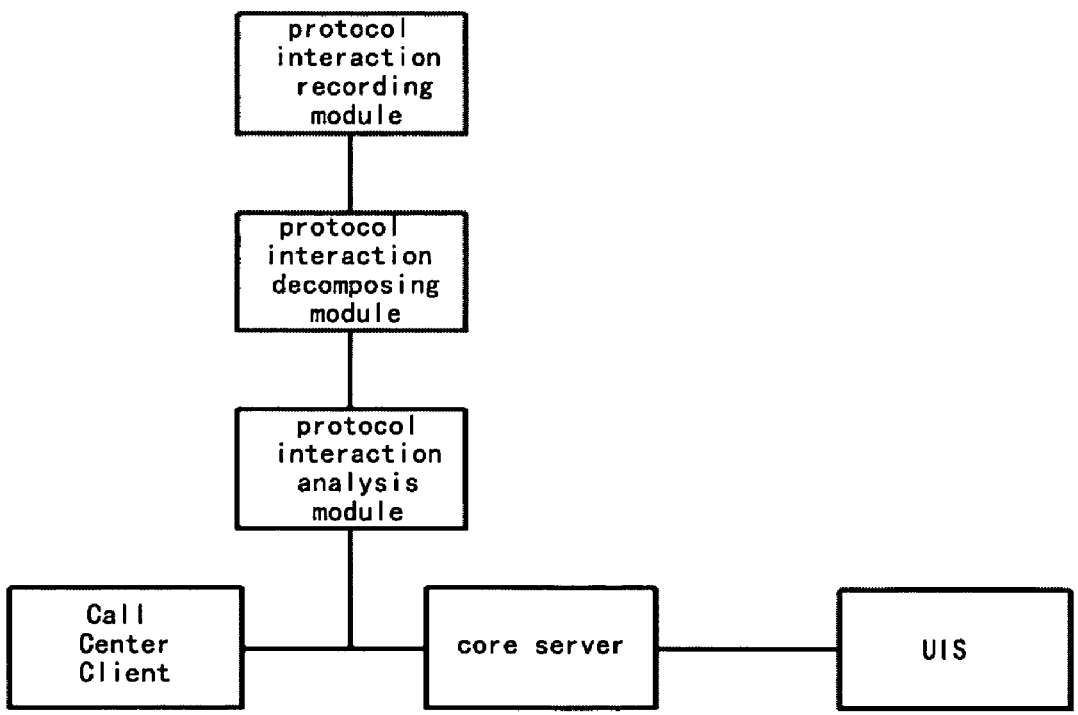
FIG. 2 is a diagram showing the networking configuration of a call center system of the embodiment of the present invention.

In order to make the call center system automatically analyze the interaction message recorded in the protocol interaction process, and realize the analysis of the API invoke, the present invention adds a protocol interaction decomposing module and a protocol interaction analysis module in the conventional call center system. FIG. 2 is a diagram showing the network configuration of the call center system of the embodiment of the present invention.

As shown in FIG. 2, the call center system of the embodiment of the present invention includes a CCC (Call Center Client), a core server connected to the CCC, a UIS (User Interface Server) connected between the CCC and the core server, a protocol interaction recording module connected between the CCC and the UIS, a protocol interaction decomposing module connected to the protocol interaction recording module, and a protocol interaction analysis module connected to the protocol interaction decomposing module. Said protocol interaction decomposing module and protocol interaction analysis module may be two individual modules or be integrated into one module, which may be embedded in the protocol interaction recording module.

The CCC provides various services matching with the Call center system, generates a message corresponding to the service according to protocols, and transfers the message to the core server through the user interface server, wherein the service is developed by using the call center system interfaces.

The core server processes the message transferred by the user interface server and, after the message processed, feeds back the process result to the call center client through the user interface server. Therefore, any API invoke of each service provided by the call center client will be embodied in the interaction message during the protocol interaction between the call center client and the UIS.

The protocol interaction recording module records the interaction message in the protocol interaction procedure between the call center client and the UIS.

The protocol interaction decomposing module decomposes each interaction message recorded in the protocol interaction module into a plurality of information segments based on the preset message structure, so that the protocol interaction analysis module may extract necessary information from each interaction message.

The protocol interaction analysis module extracts necessary information from the interaction message decomposed by the protocol interaction decomposing module and thus generates the API invoke sequence and the API invoke frequency.

The present invention further provides a method for obtaining the interface invoke information by using the above mentioned call center system. Since any API invoke of the call center client is embodied in the interaction message during the protocol interaction procedure between the call center client and the UIS, the user behavior analysis may be realized by only analyzing the interaction message in the protocol interaction procedure between the call center client and the UIS.

Figure 3:
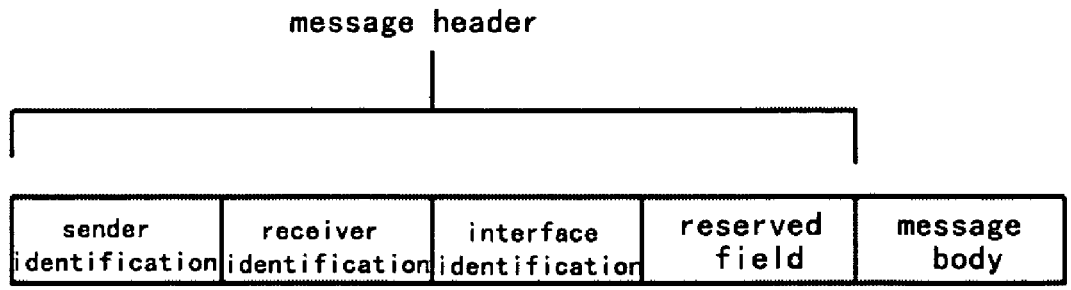
FIG. 3 is a schematic diagram of the message structure.

The interaction messages of the embodiment of the present method adopt the same message structure, as shown in FIG. 3. In FIG. 3, the message structure includes a message header and a message body. The message header includes an interface identification for identifying different APIs, a connection identification for identifying each specified service, and a reserved field for extendable. The connection identification represents a transmitter identification and a receiver identification.

Figure 4:
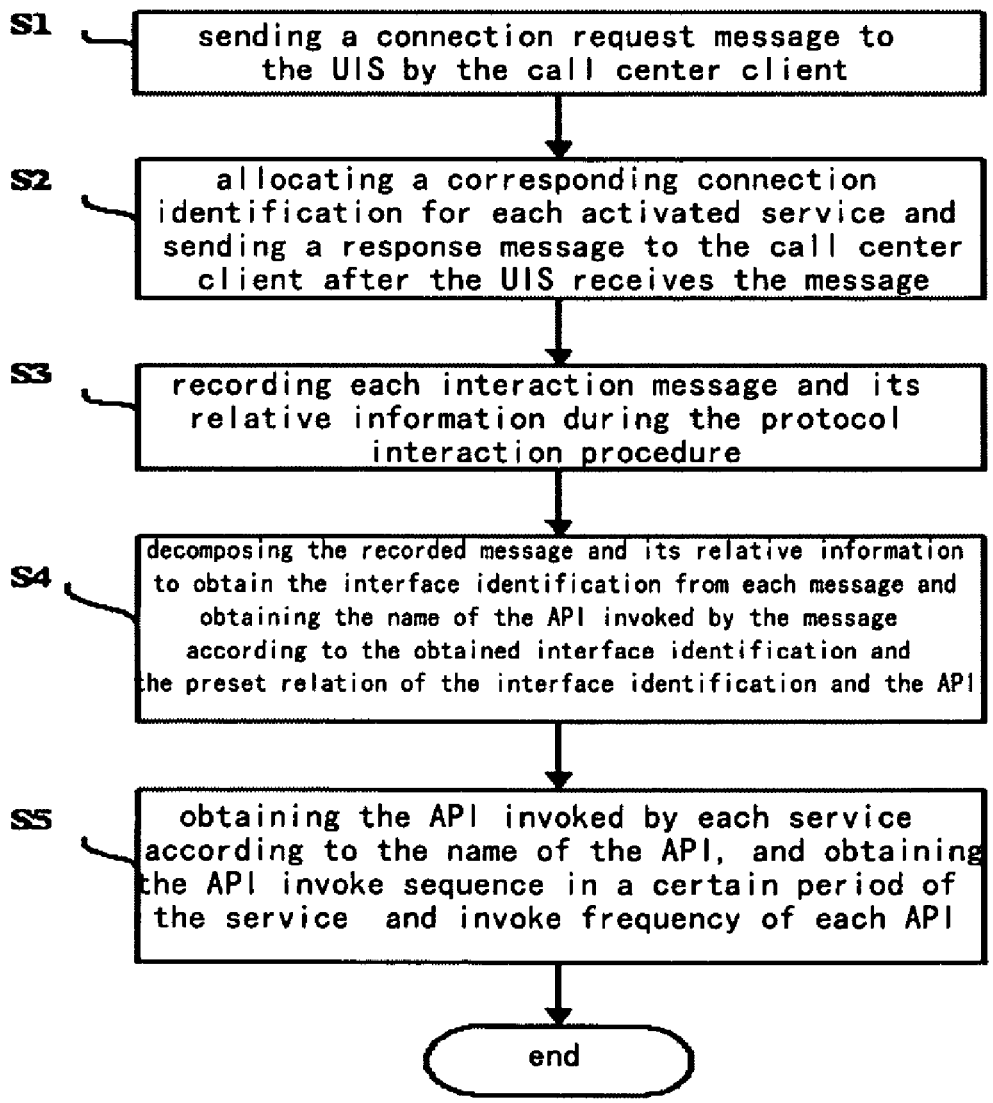
FIG. 4 is a flowchart of the method according to the embodiment of the present invention.
Figure 5:
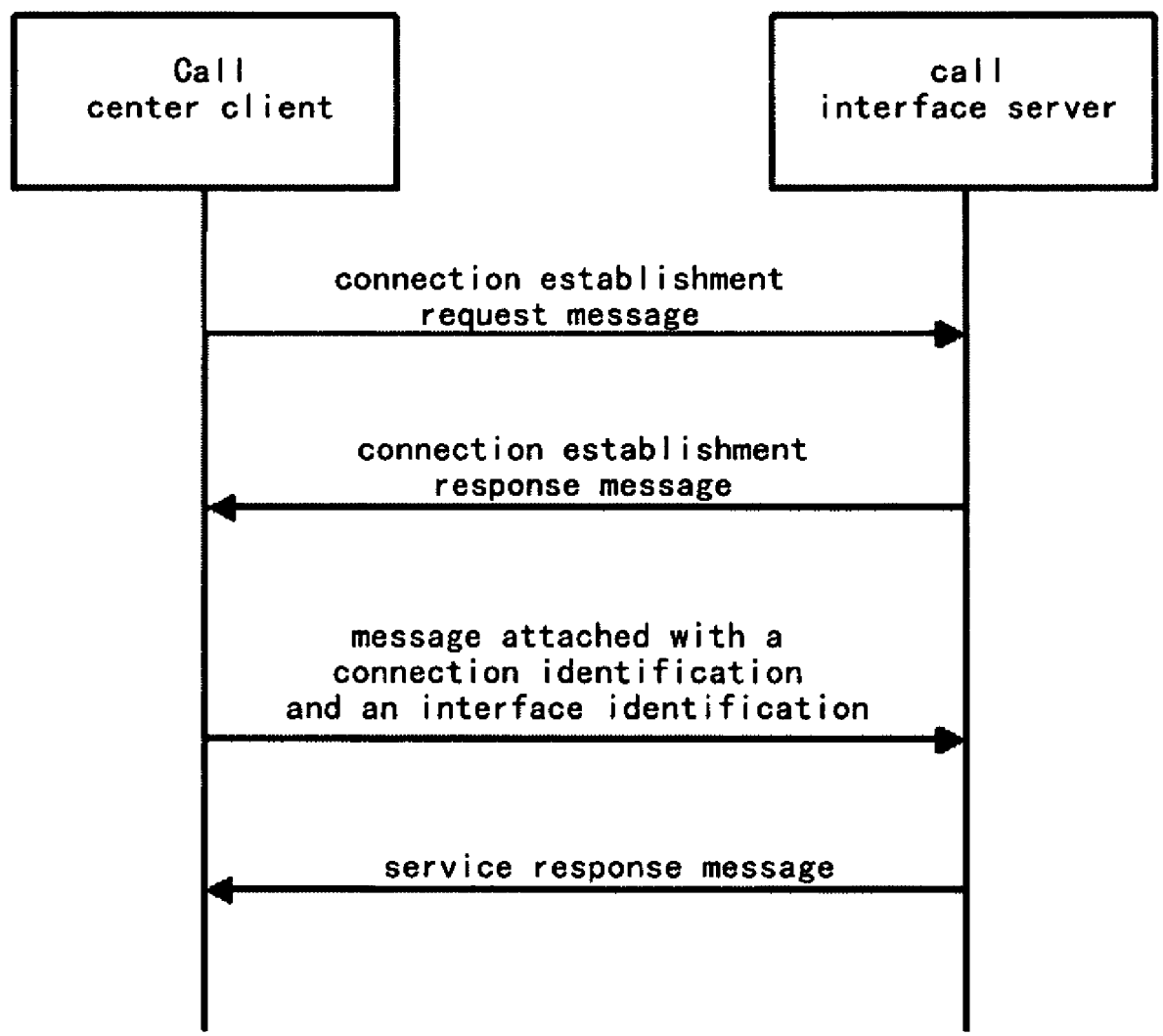
FIG. 5 is a signaling interaction flowchart of the method according to the embodiment of the present invention.

FIGS. 4 and 5 show the flowchart of the method of the embodiment of the present invention. The method includes following detailed steps as shown in the figures.

S1. After a specified service of the call center client is activated, the call center client sends a connection establishment request message to the UIS. The connection establishment request message includes an interface identification corresponding to the API interface invoked by the said service, such as interface identification 500 corresponding to the invoked API interface A.

S2. After the UIS receives the message, it allocates a corresponding connection identification for each activated service and sends a response message to the call center client to establish the connection. In this step, the call center client may establish connections for a plurality of specified services successively with the UIS, and allocate corresponding connection identifies for each specified service. For example, suppose there are two services to be connected, the connection identification allocated to the first service may be 1008 and the connection identification allocated to the second service may be 1009.

After executing the above steps, the message interaction complying with the protocol standards are performed continuously between each specified service and the UIS during the running procedure of each specified service. The interaction message accords with the message structure, that is, the message header of each message contains an interface identification corresponding to the invoked API for processing the message, and the transmitter identification and the receiver identification which are identical to the connection identification of the same service allocated by the UIS. The invoked API for processing the message is determined by the flow of the specified service.

For example, if a message sent by a first service invokes interface A, the interface identification corresponding to the interface A is 500 and the connection identification of the first service is 1008 according to the above-mentioned definitions, the transmitter identification and the receiver identification in the message header of the message both are 1008 and the interface identification is 500.

S3. When the protocol interaction is performed between the call center client and the UIS, the specified service each message belonging to is distinguished by the connection identification attached in each message, and thus the interaction messages between each specified service and the UIS are recorded, meanwhile, the information, such as the interaction time of the message and/or the transmitter and the receiver of the message and the like, relative to the message is recorded.

S4. During or after the running procedure of the specified service, the recorded messages sent by each service and the relative information are decomposed one by one, or the recorded messages received by each service and the relative information are analyzed one by one. Since the interaction messages in the embodiment of the present method adopt the same message structure, the interface identification in the messages may be automatically acquired from each message according to the preset message structure, and the name of the API invoked by the message is obtained according to the interface identification and the preset relationship of the interface identification and the API.

S5. According the API name obtained in step 4, the names of the APIs invoked during the running procedure of each specified service may be obtained. And according to the recorded interaction time of each message, the sequence of the service invoked by the API in a certain period may be obtained. Moreover, according to the APIs invoked during the running procedure of each specified service, the invoke frequency of each API may be obtained.

According to the information relative to the API invoke obtained by the abovementioned method, user behaviors during the running procedure of various services may be obtained.

While the invention has been particularly shown and described with reference to the preferred embodiment thereof, it will be understood by those skilled in the art that various changes in form and detail may be made therein without departing from the spirit and scope of the invention.

The invention claimed is:

1. A call center system comprising a call center client, a core server, a user interface server and a protocol interaction recording module, the call center client being configured to provide various services matching with the call center system, generating a message corresponding to the service and transferring the message to the core server through the user interface server;

the core server being configured to process the message transferred by the user interface server and transferring the process result to the call center client through the user interface server; and the protocol interaction recording module being connected to the call center client and the user interface server, and recording the interaction message as well as the relative information of the interaction message according to a connection identification attached in the interaction message during the protocol interaction procedure between the call center client and the user interface server, wherein the interaction message including an interface identification of the invoked application programming interface and the connection identification corresponding to the service, wherein the connection identification represents a transmitter identification and a receiver identification, and the relative information of the interaction message comprises the transmitter identification and the receiver identification of each interaction message, wherein, the call center system further comprises:

a protocol interaction decomposing module for decomposing each interaction message recorded by the protocol interaction recording module according to the predefined message structure; and a protocol interaction analysis module for generating the invoke information of the application programming interface according to the decomposed information by the protocol interaction decomposing module.

2. The system according to claim 1, wherein, the protocol interaction decomposing module and the protocol interaction analysis module are two individual modules or integrated as one module.

3. The system according to claim 1, wherein, the relative information of the interaction message further comprises the interaction time of each interaction message.

4. A method for obtaining the interface invoke information, comprising the steps of:

sending a connection establishment request message to a user interface server by a call center client after a service is activated, wherein the connection establishment request message includes an interface identification corresponding to an application programming interface invoked by the said activated service;

upon receiving the connection request message, the user interface server allocating a connection identification for the activated service and sending a response message to the call center client, wherein the connection identification represents a transmitter identification and a receiver identification;

performing interactions between the call center client and the user interface server, wherein the interaction messages are attached with the connection identification of the activated service and the interface identification corresponding to the application programming interface invoked during the interaction processing, and recording the interaction message and relative information of the interaction message according to the connection identification attached in the interaction message, wherein the relative information of the interaction message comprises the transmitter information and the receiver information of each interaction message; and decomposing the recorded interaction messages and obtaining the information of the application programming interface invoked by each service according to the name of the application programming interface corresponding to the interface identification obtained from each message.

5. The method according to claim 4, wherein, the recorded interaction messages are decomposed one by one according to the interaction sequence of the interaction message to obtain the sequence of the application programming interface invoked by each service.

6. The method according to claim 4, wherein, the frequency of the application programming interface invoked by each service is obtained according to the name of the application programming interface.

7. The method according to claim 4, wherein, the interaction messages between the call center client and the user interface server adopt the same message structure; and the recorded interaction message is decomposed according to the message structure.

8. The method according to claim 5, wherein, the interaction messages between the call center client and the user interface server adopt the same message structure; and the recorded interaction message is decomposed according to the message structure.

9. The method according to claim 6, wherein, the interaction messages between the call center client and the user interface server adopt the same message structure; and the recorded interaction message is decomposed according to the message structure.

10. The method according to claim 4, wherein, the relative information of the interaction message further comprises the interaction time of each interaction message.

* * * * *